(12) United States Patent
Loiodice et al.

(10) Patent No.: US 8,112,799 B1
(45) Date of Patent: Feb. 7, 2012

(54) METHOD, SYSTEM, AND COMPUTER PROGRAM PRODUCT FOR AVOIDING CROSS-SITE SCRIPTING ATTACKS

(75) Inventors: Luca Loiodice, Austin, TX (US); Justin William Patterson, Austin, TX (US)

(73) Assignee: Symantec Corporation, Mountain View, CA (US)

(*) Notice: Subject to any disclaimer, the term of this patent is extended or adjusted under 35 U.S.C. 154(b) by 1461 days.

(21) Appl. No.: 11/508,076

(22) Filed: Aug. 22, 2006

Related U.S. Application Data

(60) Provisional application No. 60/711,012, filed on Aug. 24, 2005.

(51) Int. Cl.
G06F 11/25 (2006.01)
(52) U.S. Cl. .............. 726/22; 726/2; 726/3; 726/23; 726/24; 726/25; 726/26; 713/194; 709/223; 709/224; 709/225; 709/226
(58) Field of Classification Search .......... 726/22–26, 726/2–3; 709/203, 227, 228, 219, 223–226; 707/10; 715/700; 725/52; 370/464; 713/194
See application file for complete search history.

(56) References Cited

U.S. PATENT DOCUMENTS

| | | | | |
|---|---|---|---|---|
| 6,499,109 | B1* | 12/2002 | Balasubramaniam et al. | 726/22 |
| 6,785,732 | B1* | 8/2004 | Bates et al. | 709/232 |
| 7,281,266 | B2 | 10/2007 | Goodman et al. | |
| 7,331,062 | B2 | 2/2008 | Alagna et al. | |
| 7,343,626 | B1* | 3/2008 | Gallagher | 726/25 |
| 7,359,976 | B2 | 4/2008 | Ross et al. | |
| 7,380,277 | B2 | 5/2008 | Szor | |
| 7,383,581 | B1 | 6/2008 | Moore et al. | |
| 7,398,553 | B1 | 7/2008 | Li | |
| 7,409,718 | B1 | 8/2008 | Hong et al. | |
| 2004/0103200 | A1* | 5/2004 | Ross et al. | 709/228 |
| 2004/0260754 | A1* | 12/2004 | Olson et al. | 709/200 |
| 2005/0021791 | A1* | 1/2005 | Sakiyama et al. | 709/229 |
| 2006/0075493 | A1* | 4/2006 | Karp et al. | 726/22 |
| 2006/0143688 | A1* | 6/2006 | Futoransky et al. | 726/1 |
| 2006/0190563 | A1* | 8/2006 | Vann | 709/219 |
| 2007/0016948 | A1* | 1/2007 | Dubrovsky et al. | 726/22 |
| 2008/0263650 | A1* | 10/2008 | Kerschbaum | 726/9 |

OTHER PUBLICATIONS

Author: Ed Skoudis; Lenny Zeltser Title: Malware: Fighting Malicious Code Publisher: Prentice Hall Pub Date: Nov. 7, 2003 Print ISBN-10: 0-13-101405-6 Print ISBN-13: 978-0-13-101405-3.*

* cited by examiner

*Primary Examiner* — Thanhnga Truong
(74) *Attorney, Agent, or Firm* — Rory D. Rankin; Meyertons, Hood, Kivlin, Kowert & Goetzel

(57) ABSTRACT

A system and method for protecting a user against a cross-site scripting attack or other network attack that relies on scripting code embedded within a uniform resource locator (URL) are described. Validation software executing on a client computer system may intercept a URL in response to a user providing the URL to a web browser or other client application. The validation software may analyze the URL to determine whether the URL includes scripting code. If the URL includes scripting code then the validation software may block the client application from accessing the URL or may otherwise inhibit access to the URL.

19 Claims, 4 Drawing Sheets

METHOD, SYSTEM, AND COMPUTER PROGRAM PRODUCT FOR AVOIDING CROSS-SITE SCRIPTING ATTACKS

PRIORITY CLAIM

This application claims priority to U.S. provisional application No. 60/711,012, titled, "Method, System, and Computer Program Product for Avoiding a Malicious Activity Within a Computer Network", filed on Aug. 24, 2005, whose inventors were Luca Loiodice and Justin William Patterson.

BACKGROUND OF THE INVENTION

1. Field of the Invention

This invention relates to computer network security. More particularly, the invention relates to a method and system for avoiding cross-site scripting attacks or other network attacks that use scripting code embedded within uniform resource locators (URLs).

2. Description of the Related Art

Markup languages such as the hypertext markup language (HTML) are used to display documents in web browsers, email clients, and other client software applications. The HTML specification provides for the ability to embed scripts within HTML code, where the scripts are written in a scripting language such as Javascript, VBScript, Tcl, etc. The script is run in the client software application when the document is loaded or at some other time, such as when a specific event occurs.

Scripts offer a means to extend HTML documents in highly useful and interactive ways. Unfortunately, scripts can also be used for malicious purposes. In particular, a type of Internet attack known as a cross-site scripting (XSS) attack or code injection attack relies on embedding scripting code within a uniform resource locator (URL).

Hackers often embed a malicious script within a URL and deceive a victim into providing the URL to their web browser or other client application, such as by clicking on a hyperlink that represents the URL or copying and pasting the URL from another document. In response, the client application proceeds as if the URL were a normal, non-malicious URL. For example, the client application typically establishes a TCP connection with a server identified by the URL and sends information, including the URL that includes the malicious script, to the server via the TCP connection. The server receives the information sent by the client application, including the URL that includes the malicious script. If the server fails to recognize the script embedded in the URL as being malicious, then the server mistakenly copies the malicious script into the server's response, which is returned by the server to the client application. In the course of processing the server's response, the client application may run the malicious script.

Running the malicious script may harm the user in various ways. As one example, the script may perform "cookie theft". When a client application such as a web browser communicates with a server, e.g., a web server, the server often creates a relatively small file called a cookie and returns the cookie to the client application. Also, the server typically stores a record of the cookie as being associated with the user and stores preferences, if any, which have been specified to the server by the user via the client application.

After receiving the cookie from the server, the client application stores the cookie in association with the server's URL or domain name. The cookie may be stored either temporarily for a particular session of communication with the server or persistently for multiple communication sessions with the server. For communicating with the server during a session, the client application typically establishes a TCP connection with the server and sends information, including the cookie, to the server via the TCP connection.

The server receives the information, including the cookie, from the client application. If the server recognizes the cookie as being associated with the user or the client application on the user's computer system, the server reads its stored record of preferences, if any, that have been specified to the server by the user. In response to the preferences, the server may respond to the information sent by the client application, e.g., by sending messages and files to the client application. Accordingly, with the cookie, the server and the client application communicate with one another while maintaining a state throughout the session.

In some cases, the preferences previously specified to the server by the user include the user's request for the server to read the user's identification information (e.g., account name or number) and password from the cookie, so that the user's client application automatically obtains access to the user's information without the user re-authenticating himself to the server, e.g., without the user having to retype the identification information and password.

Use of a cookie in this manner thus provides convenience for the user. However, the cookie also exposes the user to potential malicious activity. In particular, a hacker may embed a malicious script in a URL, where the malicious script is returned to the client application in a response from the server and is run by the client application, as described above. In some examples, the malicious script is operable to instruct the client application to send the user's cookie to a malicious server when the client application runs the malicious script. The cookie received by the malicious server may then be used for malicious purposes.

For example, an application on the malicious server may use the cookie to communicate with the server, similar to the manner in which a legitimate client application on the user's computer system uses the cookie to communicate with the server. When the server recognizes the cookie as being associated with the user, the server may mistakenly respond by sending messages and files to the application on the malicious server. In one example, if the user's preferences include the user's request for the server to read the user's ID and password from the cookie, then the malicious server, by sending the cookie to the server, obtains access to the user's information without the user re-authenticating himself to the server.

The malicious server may then perform online theft or otherwise utilize the user's information for malicious purposes. For example, the malicious server may perform monetary theft, intellectual property theft, identity theft, fraud, etc. In one example, the hacker or malicious server views, captures or otherwise obtains the user's identification information (e.g., account name or number), password, financial information, and/or other sensitive information from the server. Accordingly, with such access, communication, and/or information, the hacker is equipped to transfer funds from the victim's financial account to the hacker's financial account, or use the victim's credit card information for purchases and cash advances, or perform other malicious activity.

In addition to cookie theft, a malicious script embedded within a URL may also perform other types of malicious activities. For example, in some cases the malicious script instructs the client application on the user's computer system to modify the server's response, such as by modifying a form action in an HTML web page that the client application received from the server. The client application displays such an HTML web page within a window on the user's client computer system, where the web page may include various form elements, such as text input boxes, check boxes, etc. The web page may request the user to enter information in the form elements, where the information is intended to be sent to the server. However, in this example, the malicious script modifies the form action to cause the information entered by the user to be sent to a malicious server instead of sending the information to the trusted server. Examples of such information are the user's authentication information (e.g., account name or number, password, PEN number, etc.), personal information (e.g., social security number, address, etc.), financial information (e.g., credit card account information, bank account information, etc.) or other sensitive information. The information sent to the malicious server may then be used for online theft or other malicious purposes, similarly as described above.

SUMMARY

Various embodiments of systems and methods for protecting a user against network attacks that rely on scripting code embedded within a uniform resource locator (URL) are described herein. According to one embodiment of the method, a URL may be received. The URL may be analyzed to determine whether the URL includes scripting code. If the URL includes scripting code then access to the URL may be inhibited in response to determining that the URL includes scripting code.

BRIEF DESCRIPTION OF THE DRAWINGS

A better understanding of the invention can be obtained when the following detailed description is considered in conjunction with the following drawings, in which.

Figure 1:
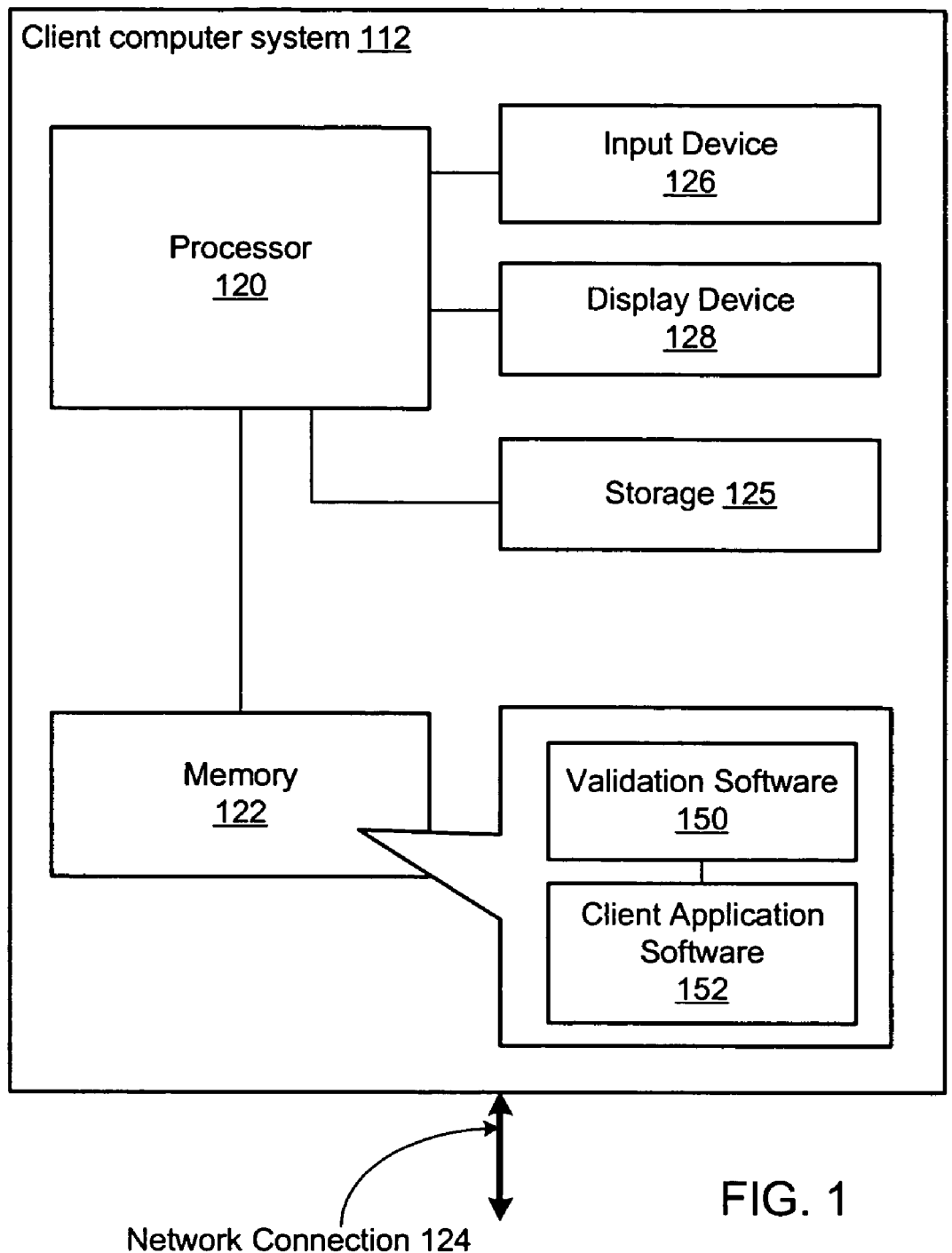
FIG. 1 illustrates an exemplary embodiment of a client computer system that executes validation software operable to determine whether uniform resource locators (URLs) include scripting code.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of systems and methods for protecting a user against network attacks that rely on scripting code embedded within a uniform resource locator (URL) are described herein. The user may interact with a client application executing on a client computer system. The client computer system may execute validation software that operates in conjunction with the client application in order to validate URLs to ensure that they do not include malicious scripting code, as described below.

For example, FIG. 1 illustrates an exemplary embodiment of a client computer system 112 that executes validation software 150 for validating URLs in this manner. The client computer system 112 includes a processor 120 coupled to a memory 122. In one embodiment, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store client application software 152 and validation software 150. The client application software 152 may comprise any application operable to utilize URLs. For example, the client application software 152 may be operable to display a hyperlink that represents a URL and allow the user to click on or otherwise select the hyperlink in order to access the URL. As another example, the client application software 152 may include a graphical user interface with an address field or text box that the user can type or paste a URL into. Examples of client application software 152 according to various embodiments include web browsers, email clients, instant messenger programs, and other applications that enable users to request access to URLs.

The client computer system 112 also includes storage 125, e.g., one or more storage devices configured to store instructions and/or data in a stable or non-volatile manner. In various embodiments the storage 125 may include any of various kinds of storage devices, such as optical storage devices or storage devices that utilize magnetic media, e.g., one or more hard drives or tape drives. In one embodiment, the storage 125 may be implemented as one or more hard disks configured independently or as a disk storage system. In one embodiment, the disk storage system may be an example of a redundant array of inexpensive disks (RAID) system. In another embodiment, the disk storage system may be a disk array, or Just a Bunch Of Disks (JBOD), (used to refer to disks that are not configured according to RAID). In yet other embodiments, the storage 125 may include RAM disks, for example.

The processor 120 may be configured to execute program instructions and to operate on data stored within the memory 122. In particular, the processor 120 may execute the validation software 150 and the client application software 152. It is noted that the processor 120 is representative of any type of processor. For example, in one embodiment, the processor 120 may be compatible with the x86 architecture, while in another embodiment the processor 120 may be compatible with the SPARC™ family of processors. Also, in one embodiment the client computer system 112 may include multiple processors 120.

The client computer system 112 also includes one or more input devices 126 for receiving user input from a user of the client computer system 112. The input device(s) 126 may include any of various types of input devices, such as keyboards, keypads, microphones, or pointing devices (e.g., a mouse or trackball).

The client computer system 112 also includes one or more output devices 128 for displaying output to the user. The output device(s) 128 may include any of various types of output devices, such as LCD screens or monitors, CRT monitors, etc.

The client computer system 112 may also include a network connection 124 through which the client computer system 112 couples to a network. The client application software 152 may communicate with one or more server computers via the network. The network connection 124 may include any type of hardware for coupling the client computer system 112 to the network, e.g., to enable communication over the network in a wired or wireless manner.

Figure 2:
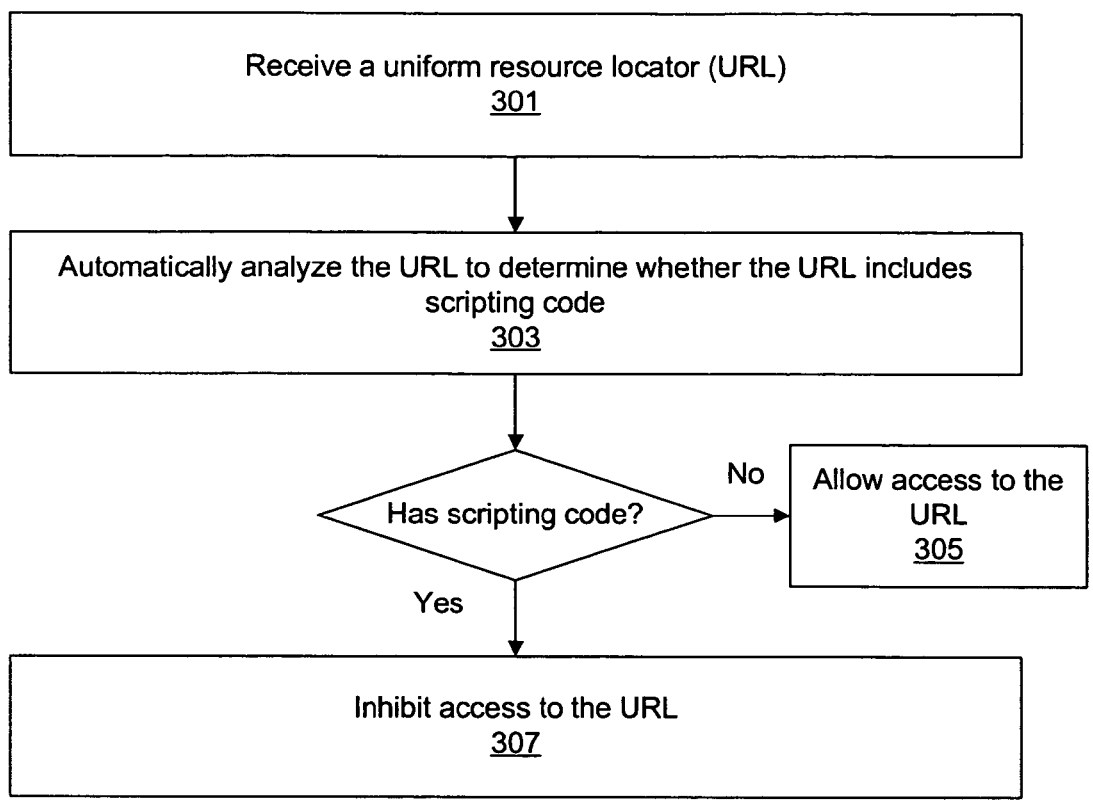
FIG. 2 is a flowchart diagram illustrating one embodiment of a method for protecting a user against network attacks that rely on scripting code embedded within a URL.

FIG. 2 is a flowchart diagram illustrating one embodiment of a method for protecting a user against network attacks that rely on scripting code embedded within a URL. The method of FIG. 2 may be performed by the validation software 150 executing on the client computer system 112 illustrated in FIG. 1.

In 301, the validation software 150 receives a URL. In one embodiment the URL may be received in response to the user providing the URL to the client application software 152. For example, as described above, the user may click on a hyperlink representing the URL or type or paste the URL into an address field of the client application software 152. In another embodiment the URL may be received in response to another application programmatically providing the URL to the client application software 152. For example, another application may call an application programming interface (API) of the client application software 152 and request the client application software 152 to access the URL.

In various embodiments the validation software 150 may interface with the client application software 152 and/or with other software executing on the client computer system 112 (e.g., networking software or operating system software) in any of various ways in order to receive the URL. The validation software 150 may interface with the client application software 152 or other software so that the validation software 150 automatically receives or intercepts the URL in response to the user (or another application) providing the URL to the client application software 152. For example, in some embodiments the client application software 152 may provide an application programming interface (API) or programming framework that enables the validation software 150 to intercept URLs before they are accessed by the client application software 152.

As one example, the client application software 152 may comprise a browser application, and the validation software 150 may be implemented as a component that interfaces with the browser application. For example, the validation software 150 may be implemented as a browser helper object (BHO) or plug-in component that communicates with the browser application through a programming interface or plug-in framework. The programming interface or plug-in framework may enable the validation software 150 to intercept the URL in 301.

In 303, the validation software 150 may automatically analyze the URL to determine whether the URL includes scripting code. In various embodiments the URL may be examined or inspected using any desired technique, algorithm, or heuristic in order to detect whether the URL includes scripting code. Exemplary techniques for analyzing the URL are described below with reference to FIG. 3.

If the URL does not include scripting code then the validation software 150 may allow the client application software 152 to access the URL, as indicated in 305. For example, the validation software 150 may simply return control to the client application software 152, and the client application software 152 may proceed to communicate with a server identified by the URL in order to receive information associated with a resource which the URL represents. For example, the URL may represent a web page on a web server, and the client application software 152 may access the URL by communicating with the web server to receive HTML and other elements of the web page.

On the other hand, if the URL does include scripting code then the validation software 150 may inhibit the client application software 152 from accessing the URL, as indicated in 307. For example, the validation software 150 may inhibit or prevent the client application software 152 from communicating with a server in order to receive information associated with a web page or other resource which the URL represents. Exemplary embodiments of inhibiting access to the URL are described below with reference to FIG. 4.

It may be desirable to inhibit access to a URL that includes scripting code because the scripting code may be executed by the client application software 152 for malicious purposes, e.g., after the scripting code has been inserted into a response from a server, as described above. Thus, inhibiting access to the URL may help to protect the user from cross-site scripting attacks or other malicious attacks based on URLs that include malicious scripting code.

Figure 3:
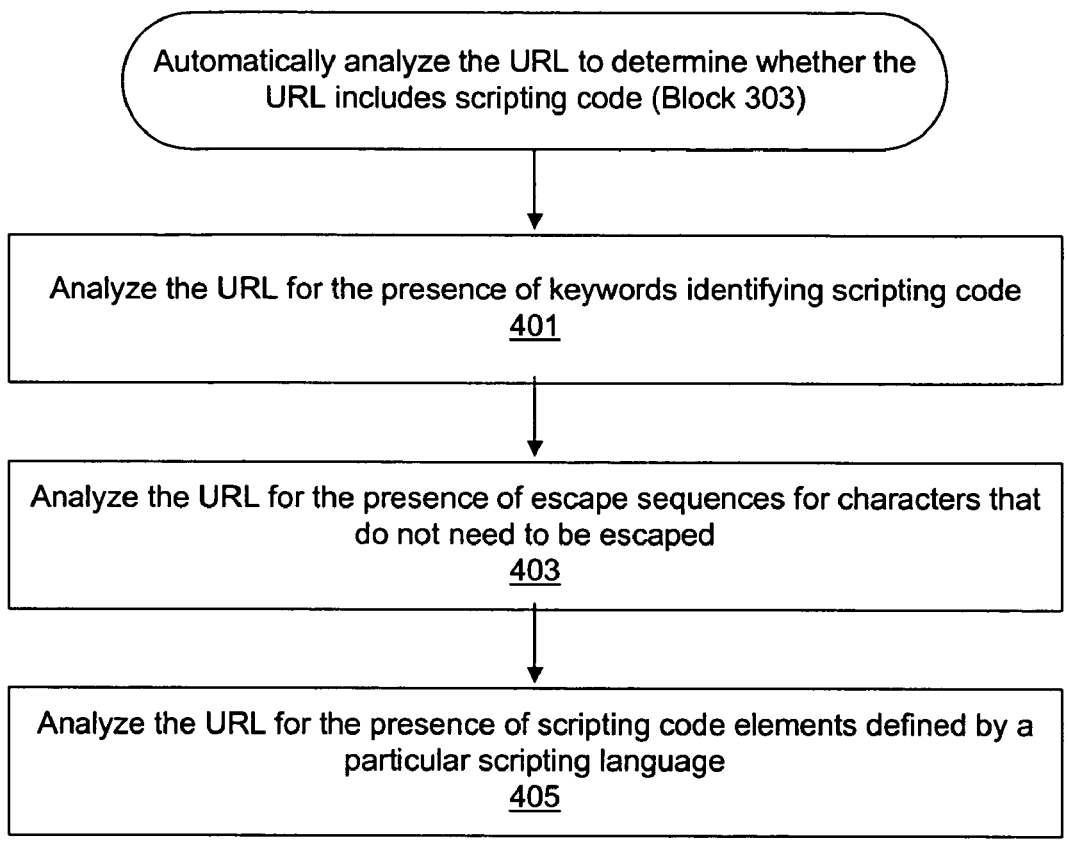
FIG. 3 is a flowchart diagram illustrating exemplary techniques for analyzing a URL in order to determine whether the URL includes scripting code.

As noted above, in various embodiments the validation software 150 may utilize any technique, algorithm, or heuristic in order to detect whether the URL includes scripting code. FIG. 3 is a flowchart diagram illustrating exemplary techniques for analyzing the URL.

As indicated in 401, in some embodiments the validation software 150 may analyze the URL for the presence of keywords or tags identifying scripting code. For example, in one embodiment the URL may be analyzed for the presence of keywords or tags which a particular markup language defines for identifying or introducing scripting code. For example, in an embodiment in which the validation software 150 operates in conjunction with a web browser or other client application software 152 that is operable to display documents represented as HTML, the validation software 150 may analyze the URL in order to detect whether the URL includes keywords or tags which HTML defines for identifying or introducing scripting code. In one embodiment the validation software 150 may analyze the URL in order to detect whether the URL includes HTML-reserved syntax that is used for introducing a script on a resulting web page. (HTML-reserved syntax is described, for example, in the HTML 4.01 Specification).

As specific examples, in some embodiments the URL may be analyzed for the presence of keywords or tags, such as "script" or "javascript" that are used by HTML page authors to make a browser execute a script's code.

As indicated in 403, in some embodiments the validation software 150 may also or may alternatively analyze the URL to detect whether the URL includes uniform resource identifier ("URI") escape sequences for characters that do not need to be escaped according to the URI specification, which is described in the January, 2005 Uniform Resource Identifier (URI): Generic Syntax memo (concerning the Request for Comments (RFC) No. 3986). Authors of URLs that include malicious scripting code sometimes attempt to disguise the scripting code embedded within the URL by writing all or part of it in the form of escape sequences instead of easily recognizable literal characters. For example, instead of including the literal keyword "script", the URL may instead include the equivalent escape sequences for some or all of the characters in this keyword.

As indicated in 405, in some embodiments the validation software 150 may also or may alternatively analyze the URL to detect whether the URL includes scripting code elements defined by a particular scripting language. This may enable the validation software 150 to determine whether the URL includes scripting code written in the particular scripting language. For example, in some embodiments the validation software 150 may examine the URL to detect whether the URL includes particular keywords used in the Javascript scripting language, the VBScript scripting language, or another scripting language.

In further embodiments the validation software 150 may not only analyze the URL in order to detect whether the URL includes scripting code but may also analyze the scripting code in order to attempt to determine whether the scripting code is malicious. For example, in some embodiments the validation software 150 may analyze the scripting code in order to attempt to determine whether the scripting code represents an attempt to perform cookie theft.

Figure 4:
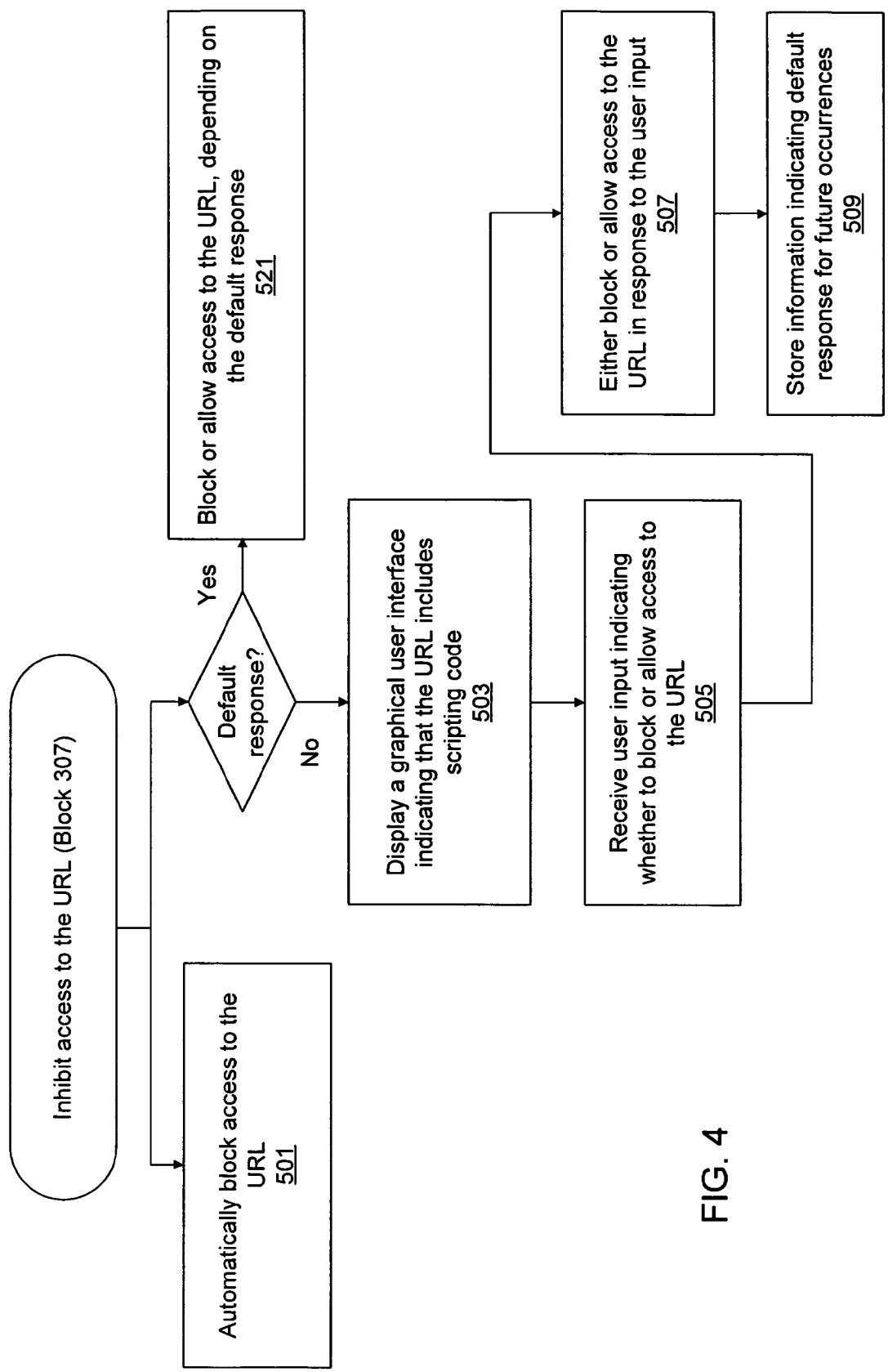
FIG. 4 is a flowchart diagram illustrating exemplary techniques for inhibiting access to a URL in response to determining that the URL includes scripting code.

As noted above, in various embodiments the validation software 150 may inhibit access to a URL in any of various ways in response to determining that the URL includes scripting code. FIG. 4 is a flowchart diagram illustrating exemplary techniques for inhibiting access to the URL.

As indicated in 501, in one embodiment the validation software 150 may automatically block access to the URL. For example, the validation software 150 may simply prevent the client application software 152 from communicating with a server in order to receive information associated with a web page or other resource which the URL represents. It may be desirable to automatically block access to the URL in some embodiments without requesting user confirmation of the blocked access.

In one embodiment the validation software 150 may also display information to inform the user that access to the URL was blocked. In one embodiment the validation software 150 may also provide the user with a selectable option to override the blocked communication if the user desires.

In another embodiment the validation software 150 may request the user to select how to respond to the URL. For example, as indicated in 503, the validation software 150 may display a graphical user interface indicating that the URL includes, or possibly includes, scripting code. The graphical user interface may enable the user to select whether to block or allow access to the URL. Such user input may be received in 505. The validation software 150 may then either block or allow access to the URL, depending on the user's selection, as indicated in 507.

It may be useful to enable access to the URL to proceed in some embodiments, for example, since it is possible that a URL may include scripting code that operates in a legitimate, non-malicious manner. Also, in some embodiments the analysis of the URL performed in block 303 may utilize heuristics that sometimes flag a URL as potentially including scripting code, but where the heuristic does not determine with complete certainty that the URL does in fact include scripting code. Thus, it may be desirable to request the user to select how to respond to the URL (or to some URLs).

In some embodiments the user may be provided selection options so that the user is able to specify whether the selection in 505 is being made on either: (a) a one-time basis, so that the validation software 150 will again notify the user in response to future detections of the same URL or future detections of other URLs associated with the same domain name that are flagged as including or potentially including scripting code; or (b) a continuing basis, so that the validation software 150 will automatically likewise block or likewise permit access to the same URL or other URLs associated with the same domain name.

If the user specifies that the selection in 505 is being made on a continuing basis, then in one embodiment the validation software 150 may store information indicating that this is the default response for future occurrences. Upon a future detection of the same URL or another URL associated with the same domain name and including scripting code, the validation software 150 may determine that the user has already specified a default response for this situation and may automatically perform the default response, as indicated in 521.

Techniques such as those described above may protect users from cross-site scripting attacks or other malicious attacks that rely on embedding scripting code within a URL. It is noted that other techniques for protecting users against these types of attacks may alternately be used, or may also be used in conjunction with the above techniques. As one example, a web server or other server may be configured to execute software that analyzes a URL received from the client application software 152 in order to detect whether the URL includes scripting code. In one embodiment, in response to determining that the URL includes scripting code the server may refuse to allow the client application software 152 to access the URL or otherwise inhibit access to the URL. In another embodiment the server may allow the client application software 152 to access the URL but may not include the scripting code embedded within the URL in a response returned to the client application software 152.

It is noted that various embodiments may further include receiving, sending or storing instructions and/or data implemented in accordance with the foregoing description upon a computer-readable memory medium. Generally speaking, a computer-readable memory medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. for storing program instructions. Such a computer-readable memory medium may store program instructions received from or sent on any transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method for avoiding a network attack, the method comprising:
   executing a client program in a client computer system, wherein the client program executes to:
      receive a uniform resource locator (URL) in a request to access the URL, wherein the URL references a server computer system;
      in response to receiving the URL, automatically analyze the URL to determine whether the URL includes scripting code, wherein said analyzing comprises analyzing the URL to detect whether the URL includes one or more of:
         scripting code elements defined by a first scripting language;
         keywords identifying scripting code; and
         tags identifying scripting code;
      inhibit access to the URL in response to determining that the URL includes scripting code.

2. The method of claim 1,
   wherein said inhibiting access to the URL comprises automatically blocking access to the URL.

3. The method of claim 1,
   wherein the keywords comprise keywords defined by a first markup language for identifying scripting code;
   wherein the tags comprise tags defined by a first markup language for identifying scripting code.

4. The method of claim 1,
wherein said analyzing the URL to determine whether the URL includes scripting code comprises analyzing the URL to detect whether the URL includes one or more of:
hypertext markup language (HTML) keywords identifying scripting code; and/or
hypertext markup language (HTML) tags identifying scripting code.

5. The method of claim 1,
wherein said receiving the URL comprises receiving the URL in response to user input specifying the URL.

6. The method of claim 1,
wherein said receiving the URL comprises intercepting the URL in response to user input providing the URL to a client application;
wherein said inhibiting access to the URL comprises inhibiting the client application from accessing the URL.

7. A computer-implemented method for avoiding a network attack, the method comprising:
executing a client program in a client computer system, wherein the client program executes to:
receive a uniform resource locator (URL) in a request to access the URL, wherein the URL references a server computer system;
in response to receiving the URL, automatically analyze the URL to determine whether the URL includes scripting code, wherein said analyzing comprises analyzing the URL to detect whether the URL includes scripting code elements defined by a first scripting language; and
inhibit access to the URL in response to determining that the URL includes scripting code; wherein said inhibiting access to the URL comprises:
displaying information indicating that the URL includes scripting code;
receiving user input indicating whether to block or allow access to the URL;
and one of:
blocking access to the URL if the user input indicates to block access to the URL; or
allowing access to the URL if the user input indicates to allow access to the URL.

8. A tangible, non-transitory computer-readable storage medium storing program instructions executable by a client computer system to:
receive a uniform resource locator (URL) in a request to access the URL, wherein the URL references a server computer system;
in response to receiving the URL, automatically analyze the URL to determine whether the URL includes scripting code, wherein said analyzing comprises analyzing the URL to detect whether the URL includes one or more of:
escape sequences for characters that do not need to be escaped; keywords identifying scripting code; and
tags identifying scripting code;
inhibit access to the URL in response to determining that the URL includes scripting code.

9. The computer-readable storage medium of claim 8, wherein said inhibiting access to the URL comprises automatically blocking access to the URL.

10. The computer-readable storage medium of claim 8, wherein said inhibiting access to the URL comprises:
displaying information indicating that the URL includes scripting code;
receiving user input indicating whether to block or allow access to the URL;
and one of:
blocking access to the URL if the user input indicates to block access to the URL; or
allowing access to the URL if the user input indicates to allow access to the URL.

11. The computer-readable storage medium of claim 8, wherein said receiving the URL comprises intercepting the URL in response to user input providing the URL to a client application;
wherein said inhibiting access to the URL comprises inhibiting the client application from accessing the URL.

12. A client computer system comprising:
one or more processors; and
memory storing program instructions;
wherein the program instructions are executable by the one or more processors to:
receive a uniform resource locator (URL) in a request to access the URL, wherein the URL references a server computer system;
in response to receiving the URL, automatically analyze the URL to determine whether the URL includes scripting code, wherein said analyzing comprises analyzing the URL to detect whether the URL includes one or more of:
scripting code elements defined by a first scripting language; and
keywords identifying scripting code; and
tags identifying scripting code;
inhibit access to the URL in response to determining that the URL includes scripting code.

13. The system of claim 12,
wherein said receiving the URL comprises intercepting the URL in response to user input providing the URL to a client application;
wherein said inhibiting access to the URL comprises inhibiting the client application from accessing the URL.

14. A computer-implemented method for avoiding a network attack, the method comprising:
executing a client program in a client computer system, wherein the client program executes to:
receive a uniform resource locator (URL) in a request to access the URL, wherein the URL references a server computer system;
in response to receiving the URL, automatically analyze the URL to determine whether the URL includes scripting code, wherein said analyzing comprises analyzing the URL to determine whether the URL includes one or more of:
HTML-reserved syntax that is used for introducing a script on a web page; and
keywords identifying scripting code; and
tags identifying scripting code;
inhibit access to the URL in response to determining that the URL includes scripting code.

15. A computer-implemented method for avoiding a network attack, the method comprising:
executing a client program in a client computer system, wherein the client program executes to:
receive a uniform resource locator (URL) in a request to access the URL, wherein the URL references a server computer system;
in response to receiving the URL, automatically analyze the URL to determine whether the URL includes scripting code, wherein said analyzing comprises analyzing the URL to detect whether the URL includes one or more of:

escape sequences for characters that do not need to be escaped; and
keywords identifying scripting code; and
tags identifying scripting code;
inhibit access to the URL in response to determining that the URL includes scripting code.

16. A tangible, non-transitory computer-readable storage medium storing program instructions executable by a client computer system to:
receive a uniform resource locator (URL) in a request to access the URL, wherein the URL references a server computer system;
in response to receiving the URL, automatically analyze the URL to determine whether the URL includes scripting code, wherein said analyzing comprises analyzing the URL to detect whether the URL includes one or more of:
scripting code elements defined by a first scripting language;
keywords identifying scripting code; and
tags identifying scripting code
inhibit access to the URL in response to determining that the URL includes scripting code.

17. A tangible, non-transitory computer-readable storage medium storing program instructions executable by a client computer system to:
receive a uniform resource locator (URL) in a request to access the URL, wherein the URL references a server computer system;
in response to receiving the URL, automatically analyze the URL to determine whether the URL includes scripting code, wherein said analyzing comprises analyzing the URL to determine whether the URL includesone or more of:
HTML-reserved syntax that is used for introducing a script on a web page;
keywords identifying scripting code; and
tags identifying scripting code;
inhibit access to the URL in response to determining that the URL includes scripting code.

18. A client computer system comprising:
one or more processors; and
memory storing program instructions;
wherein the program instructions are executable by the one or more processors to:
receive a uniform resource locator (URL) in a request to access the URL, wherein the URL references a server computer system;
in response to receiving the URL, automatically analyze the URL to determine whether the URL includes scripting code, wherein said analyzing comprises analyzing the URL to determine whether the URL includes one or more of:
HTML-reserved syntax that is used for introducing a script on a web page; and
keywords identifying scripting code; and
tags identifying scripting code;
inhibit access to the URL in response to determining that the URL includes scripting code.

19. A client computer system comprising:
one or more processors; and
memory storing program instructions;
wherein the program instructions are executable by the one or more processors to:
receive a uniform resource locator (URL) in a request to access the URL, wherein the URL references a server computer system;
in response to receiving the URL, automatically analyze the URL to determine whether the URL includes scripting code, wherein said analyzing comprises analyzing the URL to detect whether the URL includes one or more of:
escape sequences for characters that do not need to be escaped;
keywords identifying scripting code; and
tags identifying scripting code;
inhibit access to the URL in response to determining that the URL includes scripting code.

\* \* \* \* \*